(12) United States Patent
Irle et al.

(10) Patent No.: US 9,764,764 B2
(45) Date of Patent: Sep. 19, 2017

(54) SUBFRAME FOR A MOTOR VEHICLE AXLE AND METHOD FOR PRODUCING A SUBFRAME

(71) Applicant: Kirchhoff Automotive Deutschland GmbH, Attendom (DE)

(72) Inventors: Carolin Irle, Siegen (DE); Christoph Meisterjahn, Sundern (DE); Josef Bartzik, Iserlohn (DE)

(73) Assignee: KIRCHHOFF AUTOMOTIVE DEUTSCHLAND GMBH, Attend (DE)

(*) Notice: Subject to any disclaimer, the term of this patent is extended or adjusted under 35 U.S.C. 154(b) by 0 days.

(21) Appl. No.: 14/902,318

(22) PCT Filed: Aug. 5, 2014

(86) PCT No.: PCT/EP2014/066782
§ 371 (c)(1),
(2) Date: Dec. 30, 2015

(87) PCT Pub. No.: WO2015/022232
PCT Pub. Date: Feb. 19, 2015

(65) Prior Publication Data
US 2016/0221606 A1    Aug. 4, 2016

(30) Foreign Application Priority Data
Aug. 12, 2013   (DE) .................. 10 2013 108 695

(51) Int. Cl.
*B62D 21/04* (2006.01)
*B62D 21/11* (2006.01)
*B62D 65/02* (2006.01)

(52) U.S. Cl.
CPC ............. *B62D 21/04* (2013.01); *B62D 21/11* (2013.01); *B62D 65/024* (2013.01)

(58) Field of Classification Search
CPC ....... B62D 21/04; B62D 21/11; B62D 65/024
See application file for complete search history.

(56) References Cited

U.S. PATENT DOCUMENTS 5,078,230 A * 1/1992 Hasuike ................... B60K 5/04
                                                                 180/291
5,609,366 A * 3/1997 Kamei ...................... B62D 21/11
                                                                 280/788

(Continued)

FOREIGN PATENT DOCUMENTS

DE       10112932 A1     10/2001
DE       10107960 A1      8/2002

(Continued)

OTHER PUBLICATIONS

International Preliminary Report on Patntability, Ch. I, dated Feb. 6, 2016—PCT/EP2014/066782.

(Continued)

*Primary Examiner* — Laura Freedman
(74) *Attorney, Agent, or Firm* — Polson Intellectual Property Law, PC; Margaret Polson

(57) ABSTRACT

A subframe for a motor vehicle axle optimized for stiffness and weight is provided. Such a subframe may comprise a base member, a cross member, and a stiffening element. The base member may have an upper shell, a lower shell connected to the upper shell, and a connecting point formed on one of the shells for a pendulum bearing of a pendulum bar. The cross member may extend in a transverse direction, be attached to the base member, and have mounts for longitudinal members of the motor vehicle. The stiffening element may be connected to at least one shell in a region of the connecting point. Also described is a production method for a subframe.

17 Claims, 10 Drawing Sheets

(56) References Cited

U.S. PATENT DOCUMENTS

| | | | | |
|---|---|---|---|---|
| 6,220,655 B1* | 4/2001 | Gure | B62D 21/11 | 296/187.09 |
| 6,402,172 B1* | 6/2002 | Suzuki | B62D 21/11 | 280/124.109 |
| 6,409,216 B2* | 6/2002 | Suzuki | B60G 7/02 | 280/124.109 |
| 6,494,472 B2* | 12/2002 | Suzuki | B62D 21/11 | 280/124.109 |
| 6,511,096 B1* | 1/2003 | Kunert | B60G 7/02 | 280/124.109 |
| 6,550,561 B2* | 4/2003 | Dau | B60G 7/001 | 180/291 |
| 6,679,523 B2* | 1/2004 | Yamamoto | B60G 7/02 | 180/311 |
| 7,976,037 B2* | 7/2011 | Yoshida | B62D 21/11 | 280/124.109 |
| 8,083,244 B2* | 12/2011 | Buschjohann | B60G 7/02 | 280/124.109 |
| 8,246,061 B2* | 8/2012 | Kang | B62D 21/11 | 180/232 |
| 8,302,979 B2* | 11/2012 | Buschjohann | B60G 7/02 | 280/124.109 |
| 8,403,347 B2* | 3/2013 | Eickmann | B60G 21/0551 | 180/312 |
| 8,579,307 B2* | 11/2013 | Buschjohann | B22D 19/0072 | 280/124.109 |
| 8,590,908 B2* | 11/2013 | Kroger | B62D 21/11 | 280/124.109 |
| 8,740,231 B2* | 6/2014 | Shibaya | B62D 21/00 | 280/124.109 |
| 8,851,520 B2* | 10/2014 | Goellner | B62D 21/155 | 280/784 |
| 8,876,132 B2* | 11/2014 | Marchena | B62D 25/08 | 180/311 |
| 8,915,326 B2* | 12/2014 | Leibl | B62D 25/08 | 180/299 |
| 8,925,942 B2* | 1/2015 | Buschjohann | B62D 3/12 | 280/124.109 |
| 9,067,621 B2* | 6/2015 | Ohhama | B62D 21/11 | |
| 9,096,271 B2* | 8/2015 | Renner | B62D 21/11 | |
| 9,096,276 B2* | 8/2015 | Komiya | B62D 21/155 | |
| 9,108,681 B2* | 8/2015 | Imanishi | B22D 17/22 | |
| 9,150,250 B2* | 10/2015 | Imanishi | B62D 21/11 | |
| 9,394,002 B2* | 7/2016 | Uicker | B23K 20/129 | |
| 9,434,417 B2* | 9/2016 | Imanishi | B22C 9/10 | |
| 9,469,344 B2* | 10/2016 | Haselhorst | B62D 21/11 | |
| 2006/0284449 A1* | 12/2006 | Miyahara | B62D 21/11 | 296/204 |
| 2011/0215545 A1* | 9/2011 | Buschjohann | B62D 21/11 | 280/124.109 |
| 2016/0152272 A1* | 6/2016 | Tomikuda | B62D 21/02 | 296/203.01 |
| 2016/0347367 A1* | 12/2016 | Yokota | B62D 21/11 | |

FOREIGN PATENT DOCUMENTS

| | | | | |
|---|---|---|---|---|
| DE | 102007012148 A1 | | 9/2008 | |
| DE | 102009043474 A1 | | 5/2010 | |
| DE | 102010025555 A1 | | 1/2011 | |
| DE | 102011116155 A1 | * | 4/2013 | B62D 21/11 |
| FR | 2725393 A1 | * | 4/1996 | B21D 53/88 |
| FR | EP 1184260 A1 | * | 3/2002 | B62D 21/11 |
| FR | 2924672 A3 | * | 6/2009 | B62D 21/11 |
| FR | 2984838 A1 | * | 6/2013 | B62D 21/11 |
| JP | 2000344130 A | * | 12/2000 | |
| JP | 2001106116 A | * | 4/2001 | |
| JP | 2001260936 A | * | 9/2001 | |
| JP | 2001294172 A | * | 10/2001 | |
| JP | 2003154966 A | * | 5/2003 | |
| JP | 2011093385 A | * | 5/2011 | B62D 21/11 |
| WO | 2005108188 A1 | | 11/2005 | |
| WO | WO 2005108188 A1 | * | 11/2005 | B62D 21/11 |
| WO | WO 2005108190 A1 | * | 11/2005 | B62D 21/155 |

OTHER PUBLICATIONS

International Search Report dated Oct. 21, 2014—PCT/EP2014/066782.

Written Opinion of the International Searching Authority dated-Oct. 21, 2014—PCT/EP2014/066782.

* cited by examiner

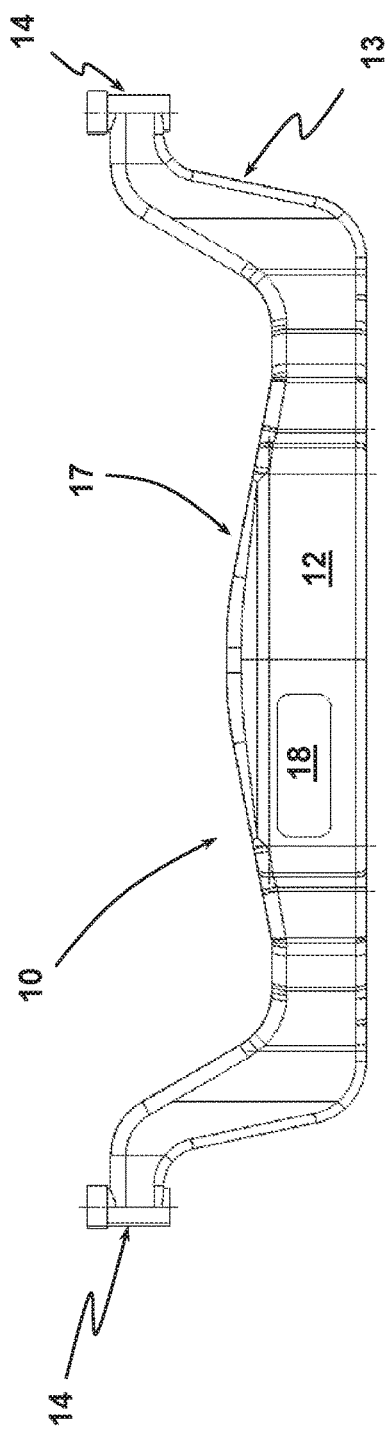
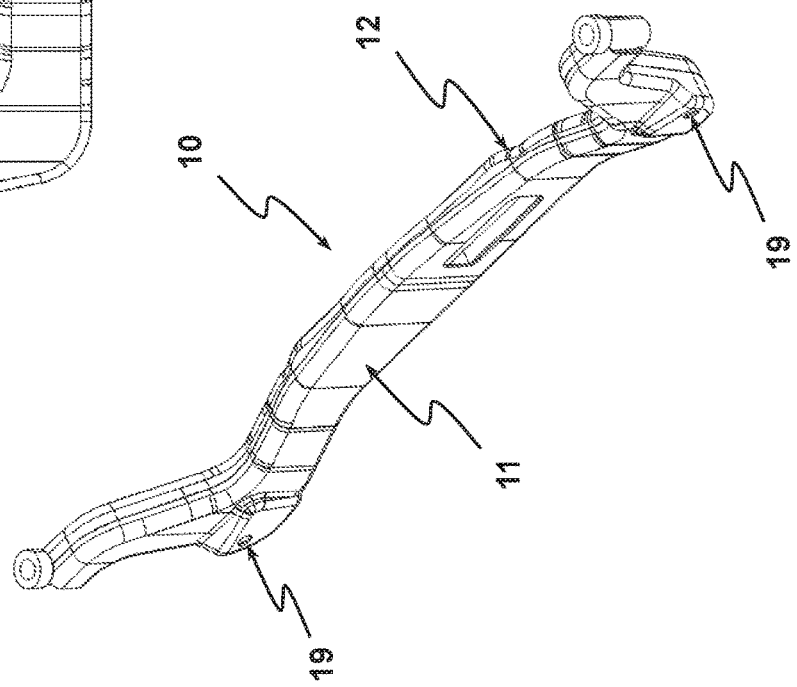
Fig. 2B
Fig. 2A

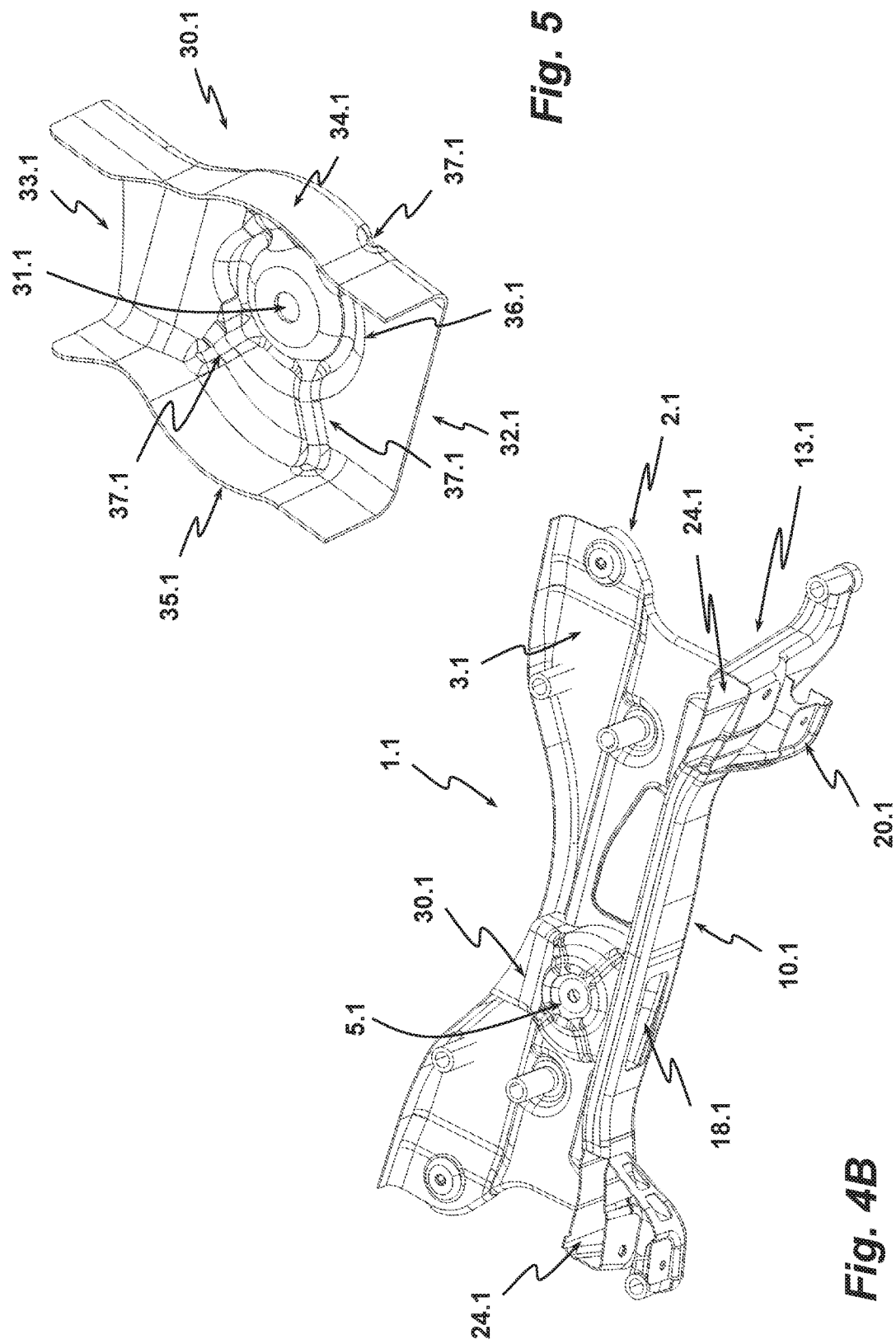

SUBFRAME FOR A MOTOR VEHICLE AXLE AND METHOD FOR PRODUCING A SUBFRAME

BACKGROUND

The invention relates to a subframe for a motor vehicle axle and a method for producing such a subframe.

In modern motor vehicles, the wheel mounts for the front wheels are usually connected to the chassis by guide arms (e.g., cross arms). Such an auxiliary frame, also known as a subframe or a front axle mount, is typically used for an articulated mounting of the guide arms. The auxiliary frame or subframe is in turn connected to the chassis, for example to the longitudinal members of the motor vehicle. The subframe may also accommodate other components. For example, it can support the engine of the vehicle by means of a pendulum support.

Subframes in which two mounts for a longitudinal member situated on opposing sides (in the y direction, based on the x direction of travel, so to the right and left) of the subframe are arranged one on each arm. In the prior art, these arms, often in the shape of "horns," are normally welded to the other components of the subframe. However, the stiffness required for such a subframe can only be achieved if relatively solid parts are used, which entails an increased use of material and a greater weight.

DE 101 07 960 A1 discloses a subframe for a motor vehicle for supporting wheel-carrying control arms. The subframe comprises a hollow tube element extending in the transverse direction of the vehicle, as well as a shell element extending in the transverse direction of the vehicle and connected to the hollow tube element. According to one embodiment shown, connecting points for steering levers are provided on the side of the hollow tube element, while connecting points for a vehicle body are provided on the shell element.

WO 2005/108188 A1 discloses a chassis element, in particular a subframe having an indentation created by deep drawing in one of its surfaces. One edge region of a sheet metal plate near the indentation is bent and laid double for reinforcement. This should prevent the use of a separate reinforcing element according to the prior art. According to one exemplary embodiment, the aforementioned indentation is in a shell of a subframe, wherein a connecting point for a pendulum bearing is provided inside the indentation. The subframe shown here comprises a base member having an upper shell and a lower shell.

Furthermore, DE 101 12 932 B4 discloses a subframe formed by an upper metal plate and a lower metal plate. Front and rear mount sections for a lower arm are formed on both sides here. A reinforcing wall section for connecting the upper plate and the lower plate is provided at the side in the region of the rear mount section.

The foregoing examples of the related art and limitations therewith are intended to be illustrative and not exclusive. Other limitations of the related art will become apparent to those of skill in the art upon a reading of the specification and a study of the drawings.

Against this background, the purpose of the present invention is to make available a subframe in which both stiffness and weight are optimized.

SUMMARY

The following embodiments and aspects thereof are described and illustrated in conjunction with systems, tool and methods which are meant to be exemplary and illustrative, not limiting in scope. In various embodiments, one or more of the above described problems have been reduced or eliminated, while other embodiments are directed to other improvements.

A subframe for a motor vehicle axle is made available by the present invention. Such motor vehicles include passenger vehicles and trucks in particular. The motor vehicle axle may typically be a front axle, but it is also conceivable to use it for a rear axle. The subframe comprises a basic member having an upper shell and a lower shell connected to the upper shell. In addition, the base member comprises a connecting point formed on one of the shells (i.e., the upper shell or the lower shell) for a pendulum bearing of a pendulum rod. Like all other position and direction descriptors used below, the position descriptors "upper" and "lower" relate to the positions of the subframe when installed in a motor vehicle. The base member is manufactured by the shell construction method, as already described. The upper shell and the lower shell may be manufactured here in particular as shaped sheet metal parts, which are welded together. The base member preferably extends essentially in the direction of the longitudinal axle and the transverse axle of the motor vehicle, but has only a comparatively slight extent in the vertical direction and is thus typically flattened on the whole. The base member usually has a shape that is symmetrical on the whole with respect to its x-z plane and corresponds to the x-z plane of the vehicle in the installed state (where the x direction corresponds to the longitudinal axis and/or the direction of travel of the vehicle). The pendulum bearing is preferably offset laterally in comparison with this plane of symmetry. It serves as a bearing for a pendulum rod, also known as a pendulum support, which may support the engine of the motor vehicle. The connecting point is the point from which forces from the pendulum bearing are introduced into the subframe. The subframe may be formed by a recess in the upper shell and/or the lower shell, through which a screw is passed to clamp the pendulum bearing.

In addition, the subframe comprises a cross member extending in the transverse direction (y direction) of the motor vehicle, this cross member being attached to the base member and connected thereto. The cross member is manufactured separately from the base member, at least in part, wherein it may consist of one or more parts and may be attached to the base member. The cross member here is provided with mounts for longitudinal members of the motor vehicle according to the invention. Thus, the minimum rod dimension of the cross member in the transverse direction is predetermined by the spacing of the longitudinal member on the vehicle end. The aforementioned mounts, which may be designed as sleeves, as boreholes within the cross member, or on the cross member, and which connect the subframe to the longitudinal member, are part of the cross member. The mounts are thus connected to one another by means of the structure of the cross member, thereby enabling much better absorption of forces acting between the mounts and the base member. The cross member can also typically be connected to the base member along a larger connecting surface and/or connecting contour than would be possible with arms that are welded individually and on which the mounts are formed. The loads for the connecting points, i.e., usually the welds, are thus lower. It is also possible to adapt the structure of the cross member to particular forces which are expected. This relates not only to the shape, but also to the amount of material (e.g., the thickness of the sheet metal that is used). Therefore, given the same load-bearing capacity, the base member can be designed to save on material and thus be much lighter, because certain forces are already absorbed by the structure of the cross member, which relieves the load on the base member.

Finally, the subframe comprises a stiffening element that is connected to at least one shell (i.e., the upper shell or the lower shell) in the region of the connecting point. The stiffening element serves to stiffen the base member in the aforementioned region, so that forces occurring in the region of the pendulum mount can be absorbed. The connection here between the stiffening element and the shell is provided at least partially in the vicinity of the connecting point. For example, the distance from the nearest connecting point to the juncture point is preferably max. 20%, and more preferably max. 10%, of the greatest longitudinal extent of the subframe (which is normally the transverse dimension in the y direction). Embodiments in which the joint is provided directly on the connecting point also come under this heading. The stiffening element may be connected to the shell on which the connecting point is formed. The connecting point is advantageously formed on the upper shell.

The mounts for the longitudinal members are preferably connected by a cross member part manufactured in one piece. The aforementioned cross member part thus constitutes a component that is manufactured in one piece, such as a shaped sheet metal part, which extends in the transverse direction from one mount to the next. Since the cross member part is not comprised of individual parts (which would need to be connected by screw connections, welds or other connecting points), it can be manufactured rapidly and efficiently while also having a high stability. It is possible for the cross member to also include additional parts, which are not designed to be continuous from one mount to the other, in contrast with the cross member part.

To be able to counteract forces acting in the vertical direction in particular, it is preferable for the cross member to have, at least primarily, one cross section with a dimension in the longitudinal direction (x direction) of the motor vehicle that is less than that in the vertical direction (z direction). This yields a better stiffening effect against forces acting vertically, while the weight of the crossbar can be kept low on the whole. It is possible that in smaller subregions, the cross section of the cross member deviates from the design described above. It is especially preferable for the dimension in the vertical direction to increase toward the center of the cross member.

The cross member can be manufactured in various ways. For example, it can be manufactured as a cast part on the whole or in parts. The cross member is typically a profiled component manufactured by cold forming or a press hardening method. Then the cross member can be manufactured by the shell manufacturing method and may include a front shell, which forms the cross member part that is manufactured in one piece and is connected to at least one rear shell or one rear shell part. Again, various designs are conceivable here. For example, a single rear shell may form a counterpart to the front shell over the entire area to a certain extent. Alternatively, for example, a plurality of rear shells can also be put together. The aforementioned shells are preferably manufactured as shaped sheet metal parts. The connection between the front shell and the rear shell can be established by welding.

In an advantageous embodiment, at least one rear shell is formed in one piece with the upper shell and/or the lower shell. In this embodiment, the upper shell and/or the lower shell and at least one rear shell are manufactured in one piece from the start as a shaped sheet metal part, for example. The manufacturing process is shortened and/or simplified in this way, and this can also have a positive effect on the overall stability of the subframe. In a central section of the cross member in particular, the rear shell may be formed by a portion of the upper shell and/or of the lower shell, whereas separate side parts form rear shells and/or shell parts in lateral sections.

According to another embodiment, the mounts for the longitudinal members are arranged on sections of the cross member running upward. Such sections, also referred to as "arms" or "horns," may run more or less straight upward, but in particular will follow an incline or a curvature. In many motor vehicles, it may be necessary for the corresponding mounts for the longitudinal members to be arranged higher than the pendulum bearing or other elements which are arranged on the subframe. This upward shift is achieved by means of the aforementioned sections. With the design of the subframe having a cross member according to the invention, it has been found that an especially good stiffness of the subframe can be achieved, even with such an exposed arrangement of the mounts.

The stiffening element is advantageously designed in the form of a shell, wherein an intermediate space is provided between the stiffening element and the shell to which the stiffening element is connected, at least adjacent to the connecting point. The stiffening element may be a shaped sheet metal part, which has a good stability and stiffness because of its shell shape. The stiffening element here contacts the connecting point at a location adjacent to the connecting point (i.e., where the introduction of force occurs). The connection may be at some distance therefrom, for example, due to welding. The stiffening element here in general forms a shell, which opens toward the shell that it is connected to. The edges of the shell of the stiffening element that are connected to the shell may be arranged symmetrically with respect to the pendulum bearing. The stiffening element may have a recess, arranged opposite a corresponding recess in the shell, which forms the connecting point. A screw is passed through the two recesses here, thereby serving to secure the axle of the pendulum bearing. In this case, the stiffening element serves not only to provide structural reinforcement of the upper and/or lower shell but also to secure the pendulum bearing. The intermediate space here can accommodate both the pendulum bearing as well as parts of the pendulum rod.

In one embodiment, in order to effectively dissipate heat occurring in the region of the pendulum bearing, the cross member has a front vent opening situated upstream from the stiffening element in the direction of travel and communicating with the aforementioned intermediate space. The forward vent opening thus allows a direct air exchange between the environment and the intermediate space, which results in an effective heat exchange. As a secondary effect, the weight of the cross member, and thus the weight of the subframe as a whole, are reduced by the front vent opening. The vent opening may also enable intervention of the pendulum rod into the region of the pendulum bearing. The stiffening element preferably engages the front vent opening by at least a portion of the stiffening element being inserted into the front vent opening. The stiffening element can be welded to the cross member there, so that the overall stability of the subframe is further improved because there is an additional indirect connection between the cross member and the base member by means of the stiffening element. Of course, the stiffening element may be welded to the cross member if the vent opening is not present.

Since the base member has an excellent stiffness in many cases because of its structure, it is possible to save on additional material and thus weight, if the cross member additionally or as an alternative to the previous vent opening has one or more additional recesses. Such a recess, even if it does not communicate with the intermediate space, can also contribute toward the dissipation of heat.

Alternatively or additionally, the heat exchange can be improved by the base member having a rear vent opening arranged downstream from the stiffening element in the direction of travel, so that it communicates with the intermediate space. If both rear and front vent openings are provided, then there is a continuous passage for air from the front side of the stiffening element to the rear. A constant air stream can pass through the intermediate space in this way and thus by the pendulum bearing. The rear vent opening yields a further weight reduction.

To make the structure of the subframe lighter according to another embodiment, the base number, in particular its upper and/or lower shell, may have at least one recess to save weight. Such recesses are provided as an alternative or in addition to the rear vent opening described above. In this case, a recess in one shell need not necessarily correspond to a recess in the other shell. In particular, the lower shell may have a recess in a region situated beneath the stiffening element.

In another embodiment, the stiffening element is arranged at least partially between the upper and lower shells. In this case, the stiffening element is encapsulated to a certain extent between the aforementioned shells in at least some regions, wherein the lower shell may optionally have recesses which serve to accommodate the stiffening element and facilitate the positioning of the two components relative to one another during the manufacturing process.

To further improve the stability of a shell structure, it is preferable for the shell on which the joining point is formed to have at least one profile structure running radially and/or concentrically with the connecting point. Such structures can be impressed directly during the manufacturing of the shell as a shaped sheet metal part, for example, so that the thickness of the sheet metal undergoes practically no change at all in the corresponding regions. The bead-type structures in this case form channels as seen from one side, or bulge-type elevations in the surface of the shell as seen from the other side.

Similarly, the stiffening element may have at least one profile structure running radially and/or concentrically to a second connecting point for the pendulum bearing, said second connecting point being formed on the stiffening element. The stiffening element here has a second connecting point, for example, a recess through which a screw can be passed to fix the pendulum bearing. The two connecting points here define the path of an axle of the pendulum bearing. Forces are already being exerted on the stiffening element by such a screw during tightening, and furthermore, forces can also be transferred from the pendulum bearing so an additional stabilization of the stiffening element may be appropriate. This is possible by means of the profile structures described here. However, stiffening can also be achieved by profile structures that do not run either radially or concentrically.

As is known from the prior art, control arms (e.g., cross arms) of a wheel suspension are arranged on both sides of a subframe. Therefore, the subframe according to the invention typically has bearing mounts for control arms of a wheel suspension for this purpose, these bearing mounts being placeable upstream and downstream from the cross member relative to the direction of travel.

In another embodiment, the bearing mounts are formed in part by the cross member. This means that forces occurring in the bearing are partially absorbed by the cross member. This design is particularly advantageous in conjunction with the arrangement of the bearing mounts upstream from the cross arm, but also in another arrangement. Such a bearing mount may be formed by a pair of opposing recesses, for example, wherein one recess runs in the cross arm and the other recess may be located in another component that is connected to the cross arm and/or to the base member. The two recesses thus define an axis about which the control arm can be connected pivotally to the subframe. The bearing mounts are advantageously formed in part by the cross member and in part by attached elements situated upstream from the cross member. Such attached elements may also be manufactured as shaped sheet metal parts.

To further improve the stability of the bearing mount, it is preferable for the lower shell to continue beneath such attached elements and for the cross member as well as the attached elements to be connected at least partially to the lower shell at the upper end. The lower shell thus forms a continuous substrate for the cross member and the attached elements in at least some regions. The cross member may have recesses that facilitate engagement with the lower shell. Likewise, the attached elements, as a continuation of the upper shell so to speak, may be open toward the bottom to facilitate a connection to the lower shell.

Through the present invention, a method is additionally made available for manufacturing a subframe for a front axle of a motor vehicle. This method comprises a base member having an upper shell, a lower shell which is connected to the upper shell from underneath, and a connecting point embodied on one of the shells for a pendulum bearing of a pendulum rod. The shells can be manufactured in advance as shaped sheet metal parts and welded to one another. A cross member, which is equipped with mounts for longitudinal members of the motor vehicle, is attached to the base member and connected to it, so that the cross member extends in the transverse direction of the motor vehicle. The connection may be a force-locking, form-fitting and/or physically-bonded connection. The cross member may be joined and welded from shaped sheet metal parts in advance in the shell construction. In addition, a stiffening element in the region of the connecting point is connected to at least one shell. This is also preferably accomplished by welding. The stiffening element may be manufactured as a shell-type shaped sheet metal part, as already described above.

The manufacturing method can be supplemented by additional steps upstream and/or downstream, resulting from the embodiments of the subframe described above. This relates in particular to the welding of attached elements onto the front side of the cross member or embossing profiled structures into the surface of the shell and/or stiffening element.

In addition to the exemplary aspects and embodiments described above, further aspects and embodiments will become apparent by reference to the accompanying drawings forming a part of this specification wherein like reference characters designate corresponding parts in the several views.

BRIEF DESCRIPTION OF THE DRAWINGS

The invention will now be explained in greater detail below on the basis of exemplary embodiments with reference to the following figures:

FIG. 2A shows a perspective diagram of the cross member of the subframe from FIG. 1A;

FIG. 2B shows a rear view of the cross member from FIG. 2A;

FIG. 4B shows a perspective diagram of the subframe from FIG. 4A in an oblique view from below with the lower shell masked out;

FIG. 5 shows a perspective diagram of the stiffening element of the subframe from FIG. 4A;

DETAILED DESCRIPTION

Figure 1A:
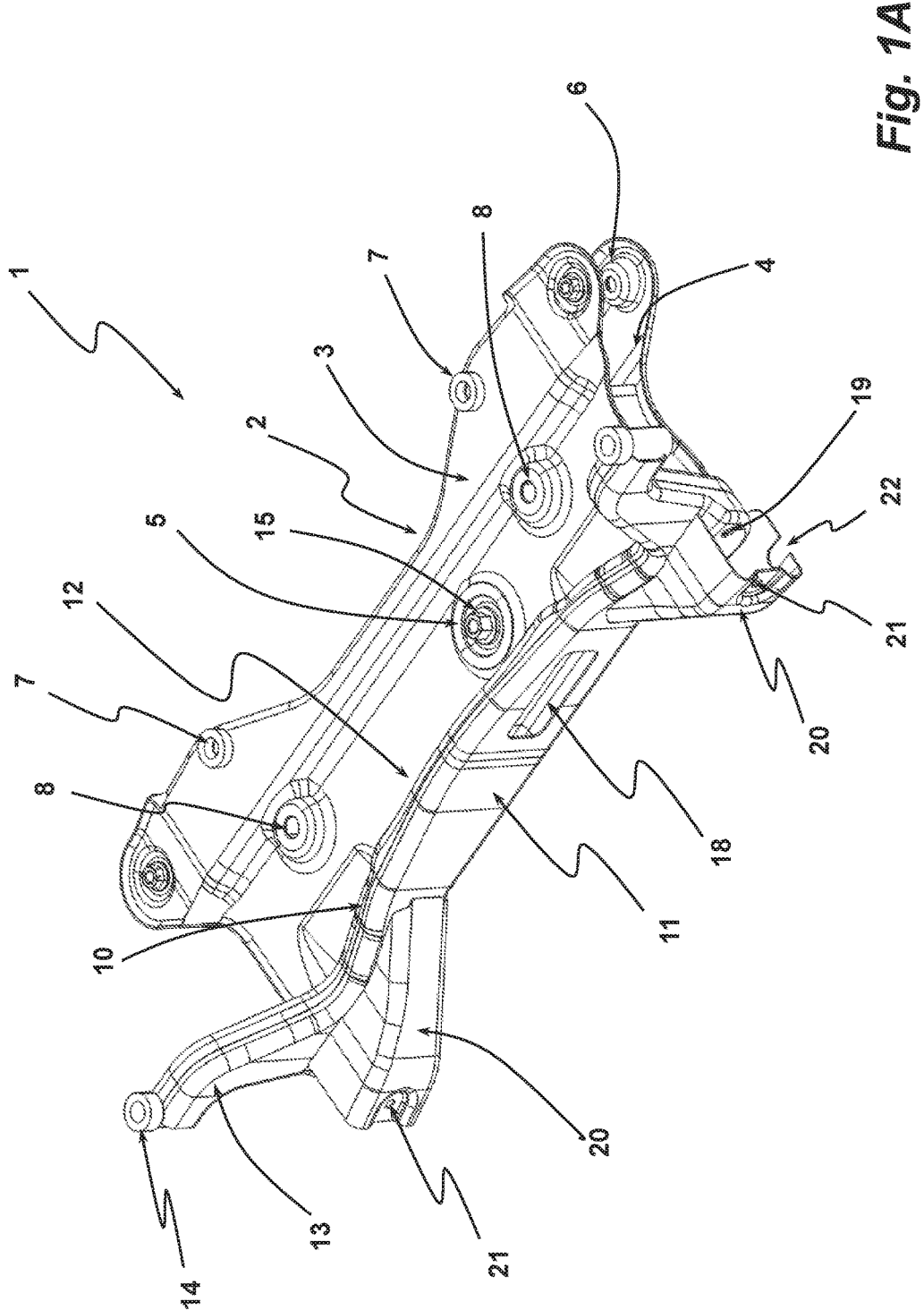
FIG. 1A shows a perspective diagram of a first embodiment of a subframe according to the invention in an oblique view from above.
Figure 1B:
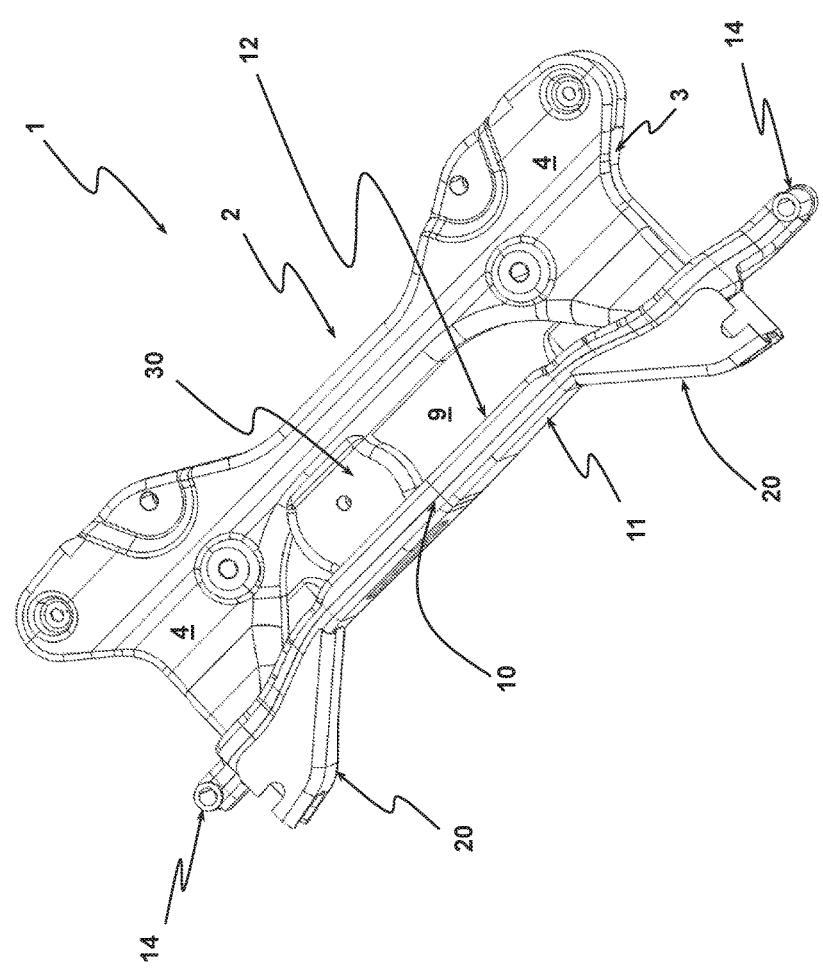
FIG. 1B shows a perspective diagram of the subframe from FIG. 1A in an oblique view from below.
Figure 1C:
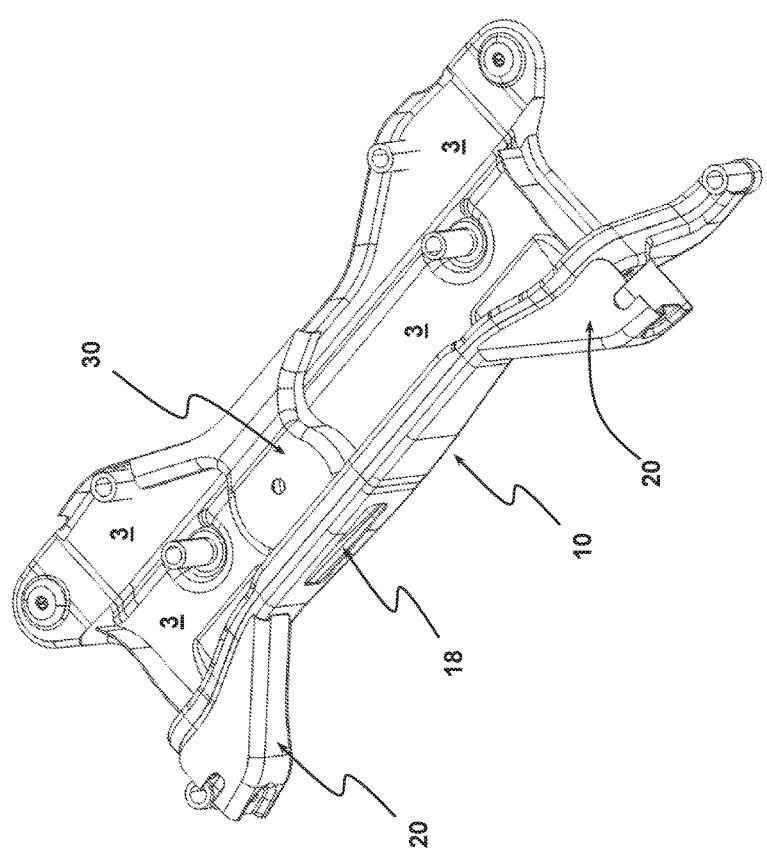
FIG. 1C shows a perspective diagram of the subframe from FIG. 1A in an oblique view from below with the lower shell masked out.

FIGS. 1A to 1C show a first embodiment of a subframe 1 according to the present invention for a front axle of a motor vehicle. The subframe 1 is symmetrical on the whole with respect to a plane which coincides with the x-z symmetry plane of the motor vehicle. A base member 2, which is manufactured by the shell construction method and has an upper shell 3 and a lower shell 4, forms the main part of the subframe 1. In a region of the base member 1 at the rear, in relation to the installed position in the vehicle, the base member 1 has rear cross arm mounts 6 for cross arms (not shown) of a wheel suspension. In addition to other mounts 7, 8 which are not described in greater detail here, a connecting point 5 of a pendulum bearing, which can accommodate a pendulum support that in turn supports the engine of the motor vehicle, is arranged on the upper shell 3, offset in relation to its center. The connecting point 5 is formed by a borehole (not visible here) through which a screw is passed from beneath and secured with a nut 15. Likewise, a connection in which the screw is inserted from above and the nut sits underneath is also possible.

Based on the direction of travel, a cross member 10 is arranged on the front side of the base member 2 and connected to the base member 2 by welding. The cross member 10 is embodied in the shell type of production with a front shell 11 and a rear shell 12, wherein the shells 11, 12 are also welded to one another. At the ends of the cross member 10, a sleeve 14 is welded to each upwardly directed extension section 13 to form a mount for a longitudinal member of the motor vehicle. Screws (not shown) are passed through the sleeves 14 for connection to the longitudinal members.

Figure 2C:
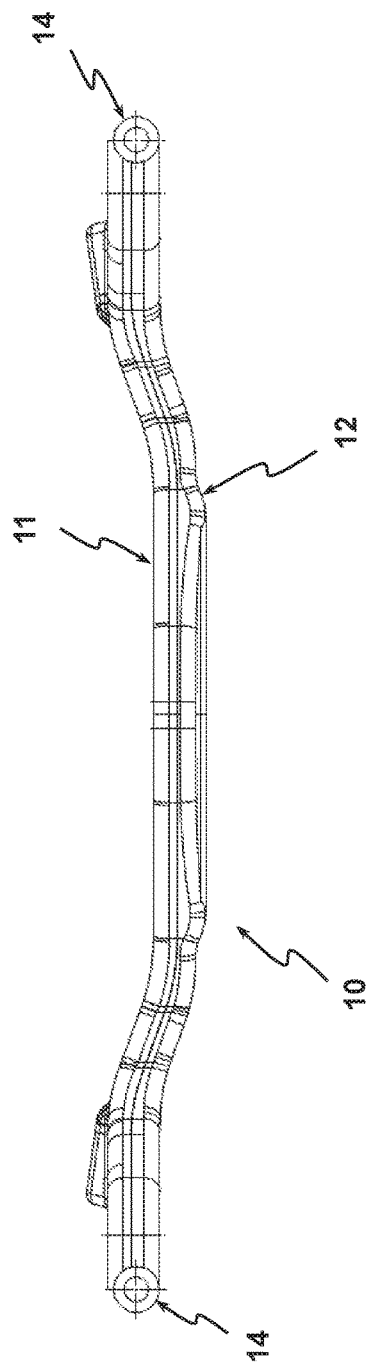
FIG. 2C shows a top view of the cross member from FIG. 2A.

The cross member 10 is shown separately in FIGS. 2A through 2C. In the manufacturing process, the cross member 10 is normally manufactured separately in the form illustrated in FIGS. 2A through 2C, by joining and welding the front shell 11 to the rear shell 12 and welding the sleeves 14 before being joined together with the base member 2 and welded. The two shells 11, 12 form a continuous cross member part which connects the mounts formed by the sleeves 14 for the longitudinal members. As indicated by the comparison of FIG. 2B to FIG. 2C, the dimension of the cross section of the cross member 10 in the vertical direction of the motor vehicle is greater than that in the longitudinal direction of the motor vehicle. It is possible in this way to optimally absorb vertical forces acting between the base member 2 and the mounts 14 for the longitudinal members. The vertical dimension increases toward a central section 17 with the cross members shown here in particular, so that increased stability and stiffness with respect to bending moments are achieved in this region.

Figure 3:
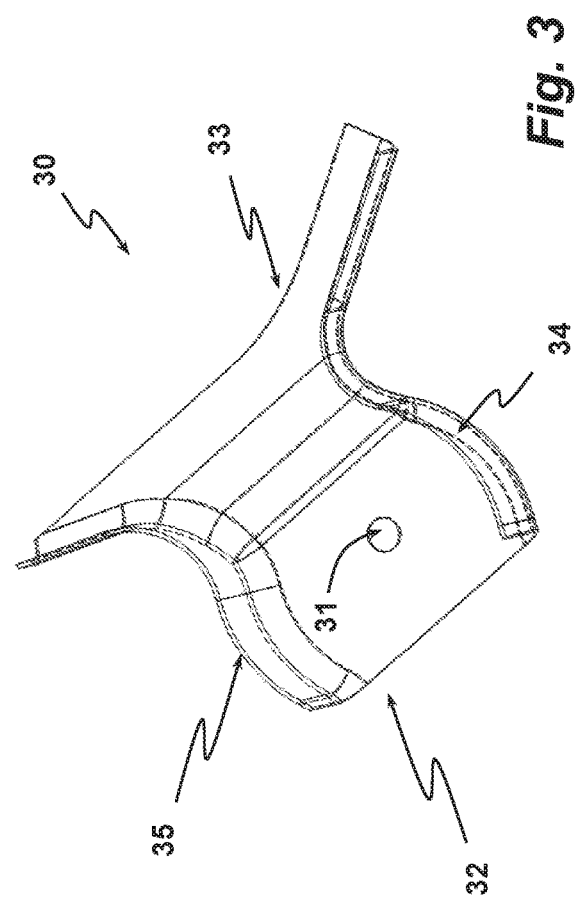
FIG. 3 shows a perspective diagram of the stiffening element of the subframe from FIG. 1A.

As shown in FIG. 1B and FIG. 1C where the lower shell 4 has been omitted, a stiffening element 30 embodied in the form of a shell is connected to the upper shell 3 in the region of the connecting point 5. The stiffening element 30, which is shown in detail in FIG. 3, is embodied as a shaped sheet metal part and is open in a front region 32 and in a rear region 33. However, wall structures are formed in the side regions 34, 35, which close the stiffening element 30 toward the sides and by means of which the stiffening element 30 is welded to the upper shell 3. The stiffening element 30 also has a borehole 31, which is opposite the connecting point 5 in the vertical direction and through which the screw mentioned above (not shown here) can be passed, engaging with the nut 15 and serving to secure the pendulum bearing. The borehole 31 thus forms a second connecting point for the pendulum bearing.

As shown in FIG. 1C, the open front region 32 of the stiffening element 30 is flush with a front vent opening 18 in the cross member 10, so that it is possible for air to pass through to the interior of the stiffening element 30 in this way. Furthermore, a pendulum rod, which is connected to the subframe 1 by a pendulum bearing at the connecting points 5, 31, can also be inserted through the vent opening. The stiffening element 30 engages the vent opening 18 and is welded to the cross member 10 there for further stabilization. Similarly, the base member 2 has a rear vent opening (not visible here) which is arranged adjacent to the rear region 33 of the stiffening element 30. There is thus a direct passageway for air between the front vent opening 18 and the rear vent opening. It is therefore possible to effectively dissipate heat, which occurs in the region of the pendulum bearing in particular. The stiffening element 30 is much wider in the rear region 33 to ensure a wider connection and thus a more effective support on the upper shell 3. As shown in FIG. 1B, the lower shell 4 has an extensive recess 9 to reduce the weight. The stiffening element 30 is arranged in the rear region 33 between the upper shell 3 and the lower shell 4, while it engages the opening 18 in the cross member 10 in the front region 32. However, the stiffening element 30 sits freely in the region of the recess 9, as seen from beneath, such that there is only a cover formed by the upper shell 3 on the top side.

Attached elements 20 for forming bearing supports are welded to the front side of the cross member 10 approximately between one of the extension sections 13 and the central section 17 of the cross member. These form a continuation of the base member 2, more or less, and are each designed as shaped sheet metal parts in one piece. Each attached element 20 here has a borehole 21, which together with a borehole 19 in the cross member 10 on the opposite side horizontally, forms a front cross arm mount 22 for a cross arm (not shown) of the motor vehicle.

Figure 4A:
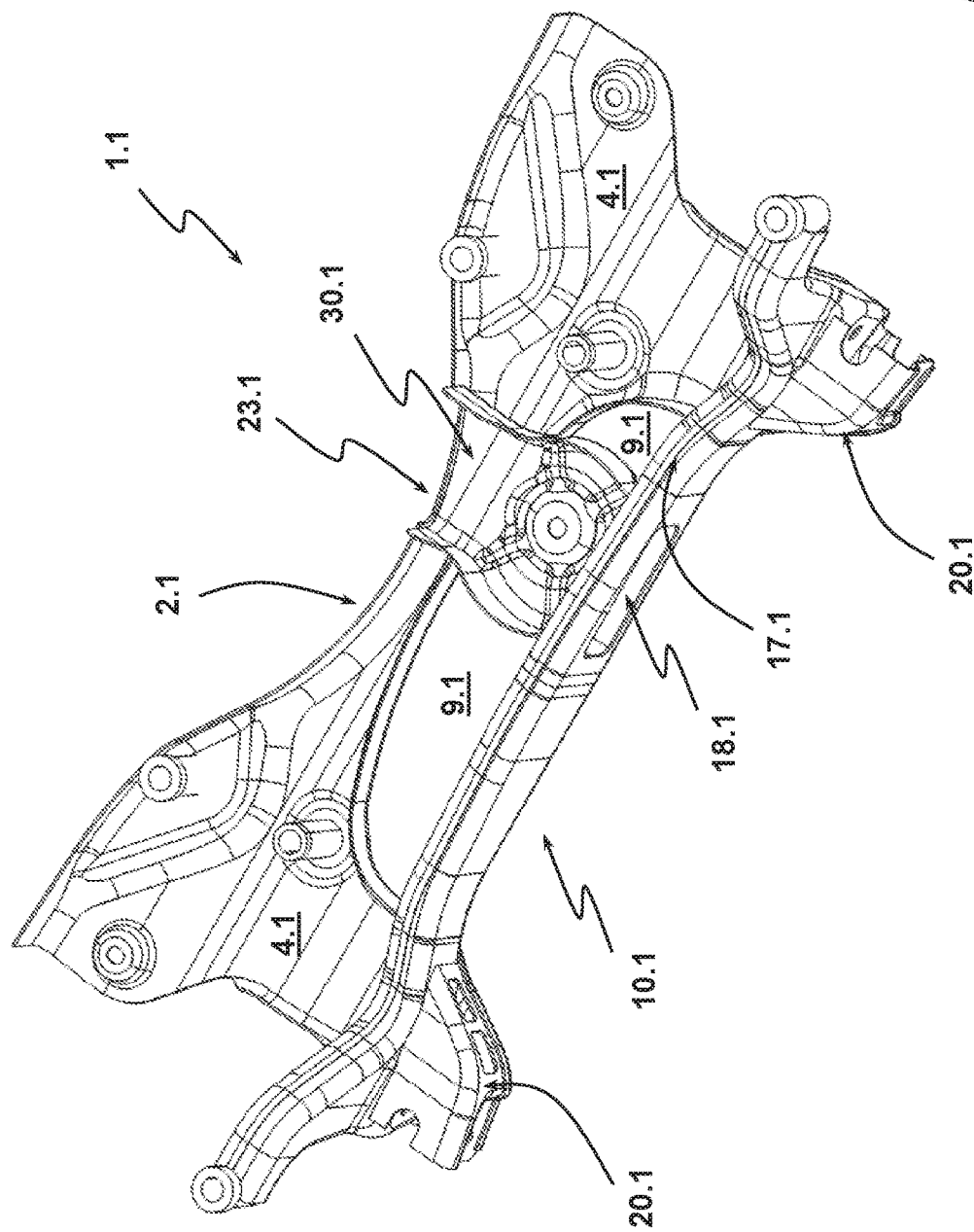
FIG. 4A shows a perspective diagram of a second embodiment of a subframe according to the invention in an oblique view from above with the upper shell masked out.

FIGS. 4A and 4B illustrate another embodiment of a subframe 1.1 according to the invention. This subframe is also made up of a base member 2.1 having an upper shell 3.1 and a lower shell 4.1 as well as a cross member 10.1. The aforementioned elements correspond to what is shown with respect to FIGS. 1A to 2C, which is why only the differences will be mentioned below.

As shown in FIG. 4A, in which the upper shell 3.1 has been omitted, the lower shell 4.1 also has a recess 9.1 to reduce the weight. An alternative, stiffening element 30.1 is arranged in part in the region of this recess 9.1 and engages a front vent opening 18.1 on the front end of the cross member 10.1 as well as engaging a rear vent opening 23.1 formed in the base member 2.1 on the rear end. Here again, the stiffening element 30.1 is arranged with a rear region 33.1 between the upper shell 3.1 and the lower shell 4.1. Again in this case, the stiffening element 30.1 is manufactured as a shell-type shaped sheet metal part, which is open in a front region 32.1 and a rear region 33.1 but is closed by walls in the lateral regions 34.1, 35.1. In this design, the rear region 33.1 is not widened and instead bead-type profile structures 36.1, 37.1 are provided for additional reinforcement of the stiffening element 30.1. These profile structures are impressed in the surface of the stiffening element 30.1 during the shaping process for manufacturing it. In the present case, a ring-type profile structure 36.1 is arranged concentrically around a borehole 31.1, which has this stiffening element 30.1 according to the borehole 31. In addition, four profile structures 37.1 running radially to this borehole 31.1 are provided. The aforementioned profile structures 36.1, 37.1 prevent deformation of the stiffening element 30.1 due to forces acting vertically, which can occur due to the screw passed through the borehole 31.1, for example, or due to the clamped pendulum bearing.

To be able to better absorb the forces acting in the region of the connecting point 5.1, the upper shell 3.1 has profile structures (not visible here) which are arranged in a suitable manner concentrically and/or radially in relation to the connecting point 5.1.

In the case of the subframe 1 shown in FIGS. 1A to 1C, the cross member 10 is attached to the base member 2 at the front and the attached elements 20 are in turn attached to the cross member 1 from the front, but in the embodiment shown in FIG. 4A, the lower shell 4.1 is guided further forward on the sides so that it reaches beneath the cross member 10.1 and alternative attached elements 20.1. The attached elements 20.1 thus, to a certain extent, form a continuation of the upper shell 3.1 and grip together with the lower shell 4.1 to which they are welded. For this reason, the attached elements 20.1 are open toward the bottom, as can be seen in FIG. 4B. Similarly, the cross member 10.1 is open toward the bottom in a region situated between a central section 17.1 and an extension section 13.1, this region being adjacent to the attachment pieces 20.1. The extension section has a recess 24.1 on each side, permitting better gripping with the lower shell 4.1. Again in this case, the cross member 10.1 and the attached elements 20.1 of the lower shell 4.1 are welded. A further improvement in stability can be achieved due to the fact that the cross member 10.1 is arranged on the lower shell 4.1 in some regions in the present case.

The exemplary embodiments shown here can be modified by various measures. In particular, individual features of the first embodiment according to FIGS. 1A through 3 can be combined with the second embodiment according to FIGS. 4A to 5 and vice versa. In addition, the embodiment of the subframe can be varied by the fact that the continuous rear shell 12 is divided into three sections, where only the lateral sections of the rear shell are manufactured in advance together with the cross member 10, and the middle section of the rear shell is manufactured in one piece with the upper shell 3 and/or with the lower shell 4.

Figure 6A:
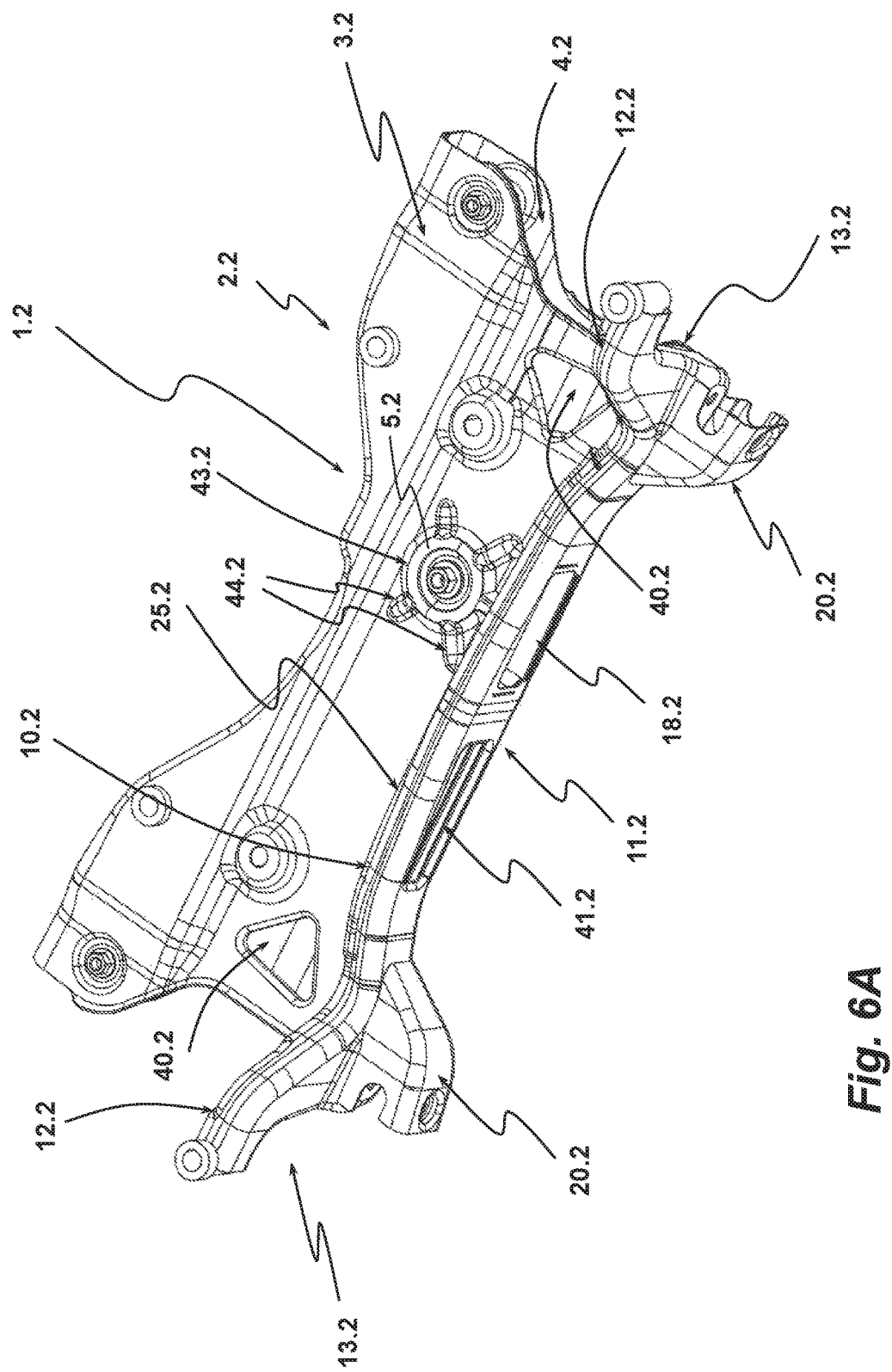
FIG. 6A shows a perspective diagram of a subframe in a third embodiment of a subframe according to the invention in an oblique view from the upper front.

A modification of the embodiments described above is illustrated in FIGS. 6A to 6C. The subframe 1.2 shown there comprises a base member 2.2 and a cross member 10.2 with extension sections 13.2. In this case, a stiffening element 30.2 is used which is identical to the one shown in FIG. 5. As can be seen in FIG. 6A, the upper shell 3.2 also has ring-shaped profile structures 43.2 running concentrically with the connecting point 5.2 as well as profile structures 44.2 running radially thereto. In addition, symmetrically arranged recesses 40.2 are provided in the upper shell 3.2 to reduce the weight—in addition to a recess 9.2 in the lower shell 4.2. In addition to a front vent opening 18.2, the cross member 10.2 has an additional recess 41.2, which serves to reduce the weight. Furthermore, in addition to a rear vent opening 23.2, which is arranged downstream from the pendulum bearing 5.2, an additional rear recess 26.2 is also provided to save on weight. The aforementioned recesses provide ventilation and thus heat exchange in addition to weight savings.

Figure 6B:
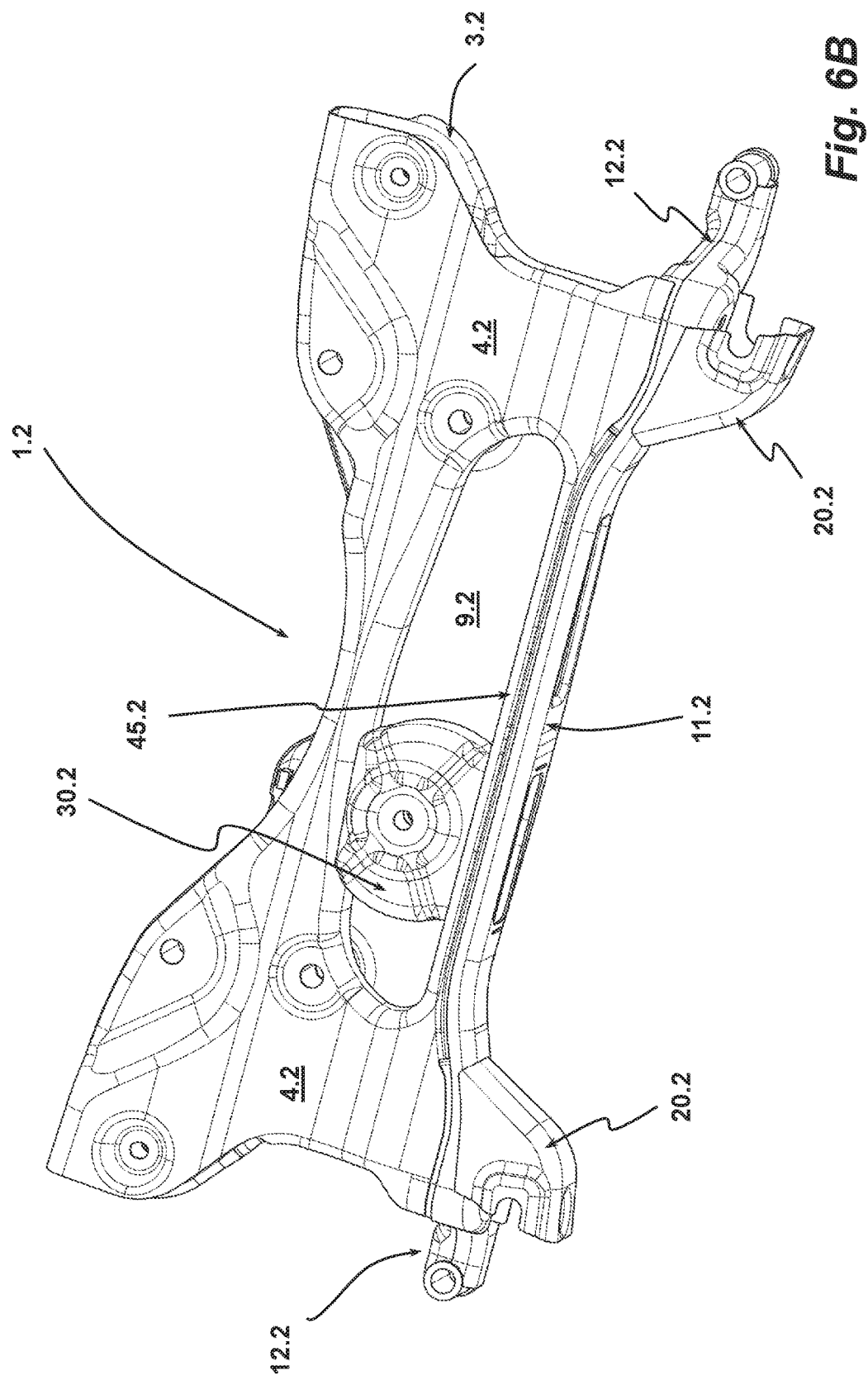
FIG. 6B shows a perspective diagram of the subframe from FIG. 6A in an oblique view from below.
Figure 6C:
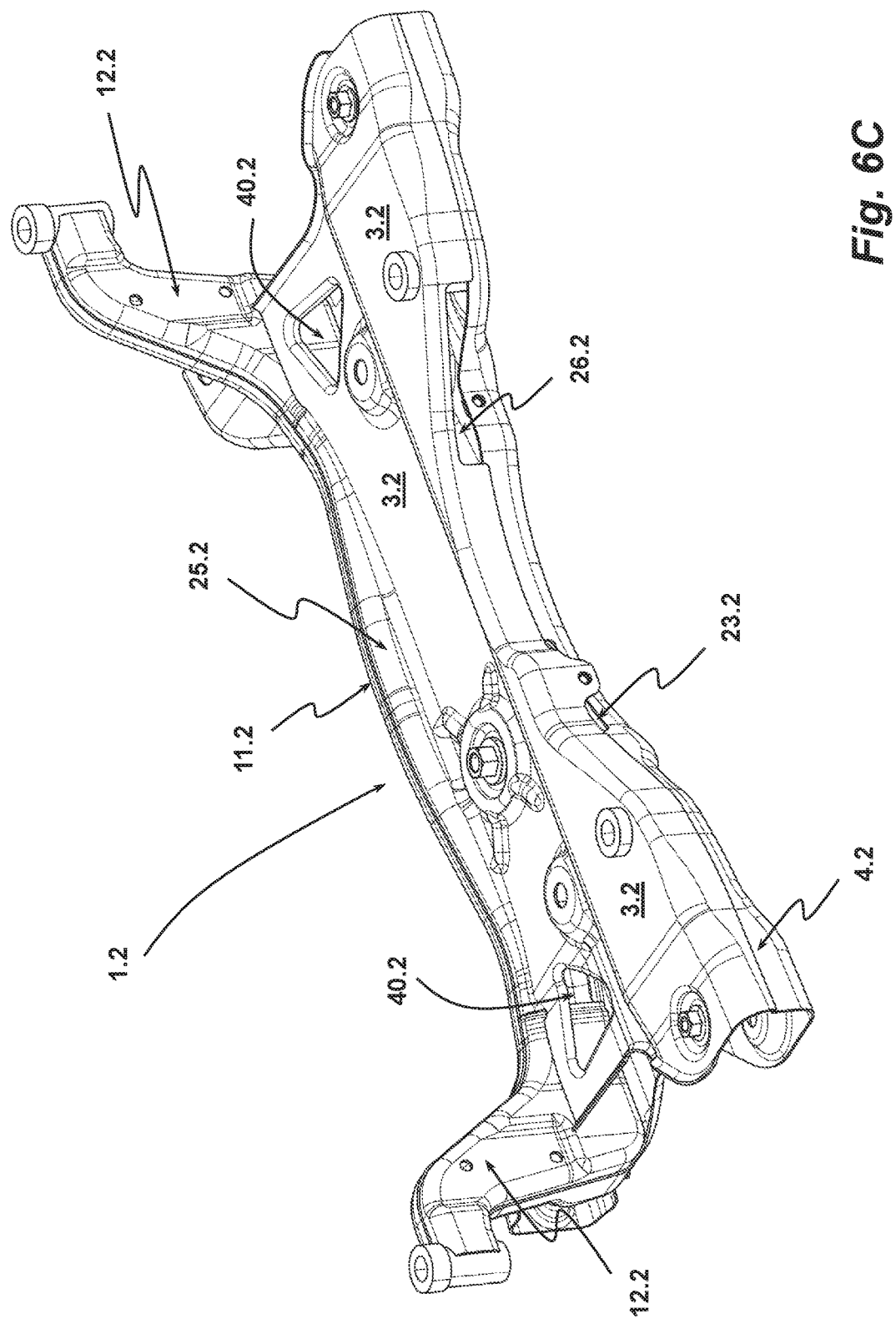
FIG. 6C shows a perspective diagram of the subframe from FIG. 6A in an oblique view from the upper rear.

In contrast with the embodiments shown in FIGS. 1A to 5, the cross member 10.2 does not have a continuous rear shell. As shown in FIGS. 6B and 6C, it is made up of a plurality of sections 12.2, 25.2, 45.2. Two lateral rear shell sections 12.2 which are manufactured separately as shaped sheet metal parts and are welded to the front shell 11.2 in advance are provided here. In the central region, the rear shell is formed by an upper rear shell section 25.2, which is designed in one piece with the upper shell 3.2, and by a lower rear shell section 45.2, which is designed in one piece with the lower shell 4.2. Due to this embodiment, the connection of the cross member 10.2 to the base member 2.2 can be improved, on the one hand, while this yields a shorter weld length so that the manufacturing time is shortened, on the other hand.

In this embodiment, the lower shell 4.2 serves to form the lower rear shell section 45.2 such that it is not passed beneath the cross member 10.2 as in the case of the second embodiment. Therefore, in this embodiment, attached elements 20.2, which correspond in their function and design to those in the first embodiment according to FIGS. 1A to 1C, are joined to the front shell 11.2 of the cross member 10.2 on the front side and welded to it. They are not supported from below by the lower shell 4.2 as in the second embodiment.

While a number of exemplary aspects and embodiments have been discussed above, those of skill in the art will recognize certain modifications, permutations, additions and sub-combinations therefore. It is therefore intended that the following appended claims hereinafter introduced are interpreted to include all such modifications, permutations, additions and sub-combinations are within their true spirit and scope. Each apparatus embodiment described herein has numerous equivalents.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims. Whenever a range is given in the specification, all intermediate ranges and subranges, as well as all individual values included in the ranges given are intended to be included in the disclosure. When a Markush group or other grouping is used herein, all individual members of the group and all combinations and subcombinations possible of the group are intended to be individually included in the disclosure.

In general the terms and phrases used herein have their art-recognized meaning, which can be found by reference to standard texts, journal references and contexts known to those skilled in the art. The above definitions are provided to clarify their specific use in the context of the invention.

The invention claimed is:

1. A subframe for a motor vehicle axle, comprising:
   a base member, the base member comprising an upper shell, a lower shell connected to the upper shell, and a connecting point, wherein the connecting point is located on at least one of said shells and configured for a pendulum bearing of a pendulum rod;
   a cross member, the cross member extending in a transverse direction and attached to the base member, the cross member arranged upstream from at least the upper shell of the base member relative to a forward direction of travel of a motor vehicle, the cross member having mounts, the mounts configured to couple with longitudinal members of the motor vehicle;
   bearing mounts for control arms of a wheel suspension, at least one of the bearing mounts arranged downstream from the cross member relative to the forward direction of travel, the hearing mounts formed at least in part by the base member; and
   a stiffening element, the stiffening element connected to at least one of said shells in a region of the connecting point.

2. The subframe of claim 1, wherein the connecting point is formed on the upper shell.

3. The subframe of claim 1, wherein the mounts are connected by a cross member part of the cross member, the cross member part being manufactured in one piece.

4. The subframe of claim 1, wherein the cross member has at least predominantly a cross section, the cross section having a first dimension in a longitudinal direction of the motor vehicle that is smaller than a second dimension in a vertical direction of the motor vehicle.

5. The subframe of claim 1, wherein the cross member is manufactured by a shell construction method and comprises a front shell, the front shell forming a cross member part and connected to at least one rear shell.

6. The subframe of claim 5, wherein the at least one rear shell is designed in one piece with the upper shell and/or the lower shell.

7. The subframe of claim 1, wherein the stiffening element is designed in the form of a stiffening element shell, wherein an intermediate space is formed between the stiffening element and the shell to which the stiffening element is connected at least adjacent to the connecting point.

8. The subframe of claim 7, wherein the cross member has a front vent opening arranged in front of the stiffening element in the direction of travel, the front vent opening capable of communication with the intermediate space.

9. The subframe of claim 7, wherein the base member has a rear vent opening arranged behind the stiffening element in the direction of travel, the rear vent opening capable of communication with the intermediate space.

10. The subframe of claim 1, wherein the cross member and/or the base member has/have at least one recess.

11. The subframe of claim 1, wherein the shell on which the connecting point is formed has at least one profile structure running radially and/or concentrically with the connecting point.

12. The subframe of claim 1, wherein the stiffening element has at least one profile structure running radially and/or concentrically with a second connecting point for the pendulum bearing formed on the stiffening element.

13. The subframe of claim 1, wherein at least one bearing mount for at least one control arm of a wheel suspension is arranged upstream from the cross member in the direction of travel.

14. The subframe of claim 1, wherein at least one bearing mount is partially enclosed by the cross member and partially enclosed by at least one attached element arranged upstream from the cross member.

15. The subframe of claim 14, wherein the lower shell is guided beneath the at least one attached element and the cross member, the at least one attached element being at least partially connected to the lower shell from above.

16. The subframe of claim 1, wherein the bearing mounts for control arms of a wheel suspension are formed at least in part by the cross member.

17. The subframe of claim 1, wherein the lower shell of the base member extends beyond the cross member in the direction of travel.

* * * * *